Figure 1:
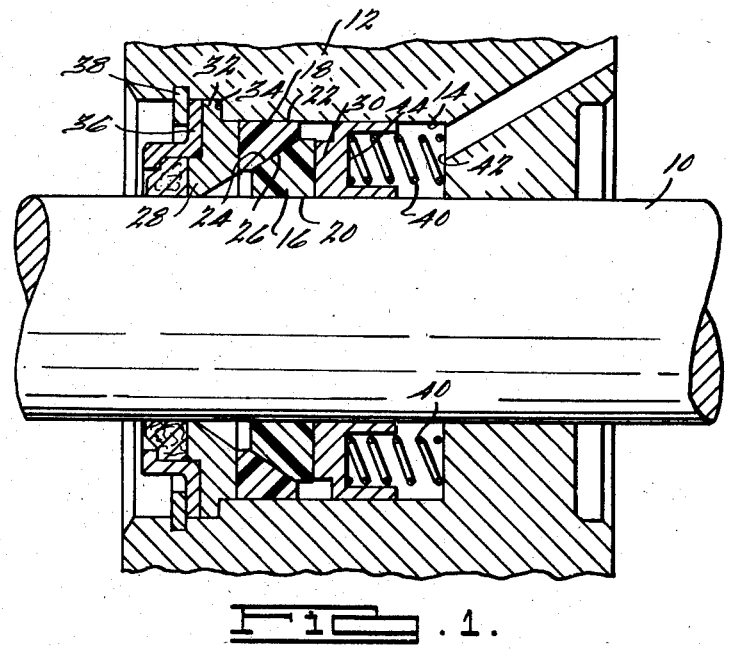

Aug. 12, 1958   J. M. LAZAR   2,847,236
WEAR COMPENSATING SHAFT SEAL

Filed Nov. 5, 1954

INVENTOR.
John M. Lazar
BY
Harness, Dickey & Pierce
ATTORNEYS.

United States Patent Office
2,847,236
Patented Aug. 12, 1958

2,847,236

WEAR COMPENSATING SHAFT SEAL

John M. Lazar, Detroit, Mich., assignor to Flexible Seal Company, a partnership

Application November 5, 1954, Serial No. 467,057

2 Claims. (Cl. 286—11.16)

This invention relates to new and useful improvements in mechanical seals.

The seal of this invention has general utility but it is particularly adapted and pre-eminently suited for sealing caustic or corrosive fluids under relatively high temperature and pressure conditions. The seal can be readily adapted to a variety of environments and is capable of maintaining an effective seal under most static and dynamic conditions. A typical environment for the seal is around the rotating or reciprocating shaft of a pump designed for handling acid or other corrosive liquid under relatively high temperature conditions.

The seal of this invention may have one or two sealing members depending upon the exigencies of the particular situation, and in order to make the seal operative under the contemplated conditions of use the sealing element or elements are made of a plastic resin material having lubricity and cold-flow characteristics. The polyamide plastic resin known in the trade as nylon and the tetrafluoroethylene plastic resin known in the trade as Teflon are typical examples of materials from which the sealing elements can be made. Both of these materials have excellent wear properties, and their lubricity characteristics are such that they can be maintained in pressed engagement with a moving part without excessive or undue wear. Also, these materials cold-flow under pressure so that they adapt themselves readily to their environment. Thus, it will be readily appreciated that the sealing elements adapt themselves readily to odd shapes or contours; and when the seal is adapted to a shaft, for example, the sealing elements adapt themselves readily to an eccentric or out-of-round condition of the shaft. Both nylon and Teflon are relatively inert to practically all chemicals and solvents, and Teflon in particular is able to withstand relatively high temperatures.

Special problems, however, present themselves in the use of these plastic materials in a seal. Some wear of the sealing elements of course occurs in use, and in order to assure a relatively long life for the seal it is necessary to provide some means for compensating for wear. In practice, it has been found that the cold-flow characteristics of the plastic materials which comprise the sealing elements of this invention can be utilized for this purpose, although the manner of adapting the materials so that these properties can be used to advantage was not immediately apparent. The cold-flow characteristic of the material, in itself, presents a problem, as the plastic tends to deform continuously under constant pressure, and it is necessary to confine the sealing element properly in order to maintain an adequate sealing pressure between the element and the surface sealed thereby. In some instances it is necessary for the seal to hold a high pressure, and under these circumstances a constant, uniform pressure must be maintained between the sealing element and the surface being sealed. Furthermore, even after means was developed for utilizing the cold-flow characteristics of the plastic material effectively for the purpose referred to above, difficulty was encountered in maintaining a proper, uniform pressure throughout the life of the seal because of a tendency for the pressure-applying means to embed itself into the relatively soft and yieldable plastic. Once this occurs, the pressure-applying means loses its effectiveness and the result is failure of the seal. Eventually it was found that certain critical relationships must be maintained between the different parts of the seal and that in some instances relative dimensional relationships between the several parts were critical. It was not until these critical relationships were worked out and developed that an effective commercially practicable seal was obtained.

Figure 2:
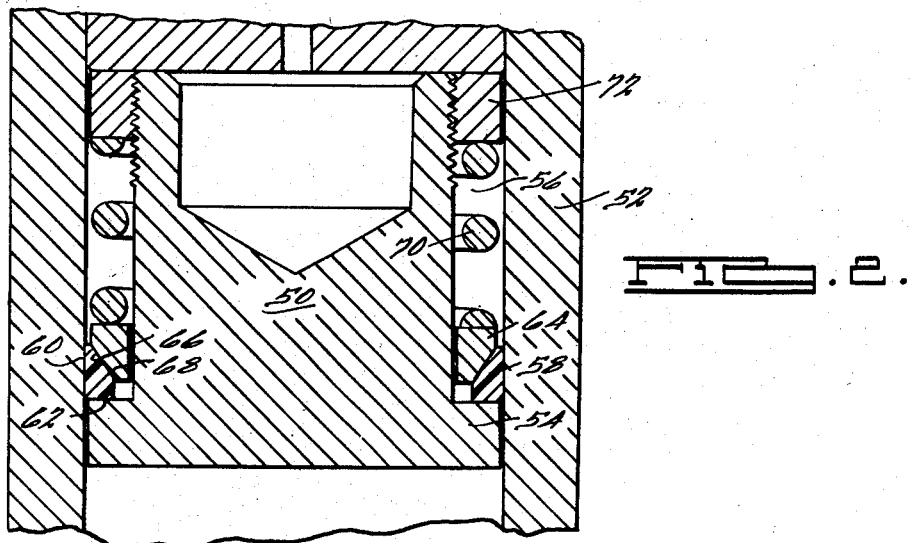

In the drawings forming a part of this specification and wherein like numerals are employed to designate like parts throughout the same, Fig. 1 is a longitudinal sectional view showing a seal embodying the invention having two sealing elements and illustrating the seal in a typical environment wherein the sealing elements prevent leakage past a rotating or reciprocating shaft and also seal the part in which the shaft is mounted, and Fig. 2 is a view similar to Fig. 1 but showing a seal having a single sealing element and illustrating a modified typical environment for this form of the invention.

Reference is first had to Fig. 1 which shows a seal embodying the invention mounted on a rotatable and/or reciprocable shaft 10 which extends through and is supported by a body 12. An internal annular recess 14 is provided in the body 12 around the shaft to accommodate the seal and it is assumed for the purpose of this description that the recess 14 communicates with a chamber (not shown) containing fluid under pressure. The purpose of the seal is to prevent leakage of the fluid through the space between the shaft 10 and the body 12 without interfering with rotation or reciprocation of the shaft.

The seal comprises inner and outer sealing elements 16 and 18. The sealing elements are generally ring-shaped and they are continuous and unbroken around the entire circumference thereof. Both of the sealing rings 16 and 18 are made of a plastic resin material having cold-flow characteristics and preferably of resin material known in the trade as nylon or Teflon. The inner sealing ring 16 fits relatively snugly around the shaft 10, and the inner annular surface 20 thereof engages the shaft around its entire circumference. The annular surface 20 is the sealing surface of the ring 16 and in use it is essential that the inner sealing surface of the element 16 be pressed against the shaft with a uniform pressure around the circumference of the shaft in order to maintain an effective sealing relation therebetween. The outer sealing element 18, on the other hand, fits snugly within the recess 14, and it has an outer annular sealing surface 22 which engages the annular wall of the recess around the entire circumference thereof. It is the purpose of the outer sealing element 18 to prevent fluid from leaking along the wall of the recess 14 and thus by-passing the seal maintained by the element 16 on the shaft 10.

Both of the sealing elements 16 and 18 are formed opposite the sealing surfaces 20 and 22 thereof with pressure surfaces 24 and 26 respectively and the pressure surface of each sealing element is complemental to the pressure surface of the other sealing element so that they mutually interengage as shown in the drawing. The angle of each pressure surface is approximately thirty-five degrees, but this angle may be varied considerably, depending upon the exigencies of the particular situation. In any event, the mutually pressed engagement of the pressure surfaces 24 and 26 effectively prevents leakage of fluid between the sealing elements 16 and 18.

In order to confine the sealing members 16 and 18 and to apply sufficient pressure axially thereagainst to maintain the inner and outer surfaces 20 and 22 thereof pressed against the shaft 10 and body 12 and to maintain the pressure faces 24 and 26 in mutually pressed engagement sufficient to maintain an effective seal, back-up rings 28 and 30 are provided on opposite sides of the sealing members. An annular flange 32 on the back-up ring 28 is held solidly against an internal radial shoulder 34 in the body by an annular cover 36 held in place by a snap ring 38. The retainer 30 also is annular in form and it bears against the inner sealing member 16 as shown in the drawing.

A plurality of compression springs 40 are confined between the retainer 30 and an internal radial shoulder 42 in the body 12, and these springs are normally compressed to maintain a constant uniform pressure against the sealing members 16 and 18. Any suitable size and number of springs 40 can be used, and both the size and number of springs may vary considerably depending upon the exigencies of the particular situation. The springs 40 should be sufficiently strong to maintain a requisite pressure on the sealing members 16 and 18, and there should be a sufficient number of springs to apply pressure more or less uniformly around the entire circumference of the seal. If desired, the retainer 30 can be provided with an annular series of sockets 44 which receive and pocket adjacent ends of the springs 40, as shown in the drawing.

In the particular seal shown, wear occurs in use on the inner annular surface 20 of the inner sealing member 16. Sealing elements made of nylon or Teflon have excellent lubricity characteristics and wear slowly, but some wear is bound to occur over a period of continuous use and wear is accelerated if an abrasive is present in the seal environment or when the seal is subjected to relatively high-speed operation or exposed to high temperature conditions. It is a feature of the present invention that wear is compensated automatically as it occurs by telescoping movement of the sealing members 16 and 18. Pressure exerted by the springs 40 causes the pressure surface 24 of the inner sealing member 16 to slide on the pressure surface 26 of the outer sealing member 18; and since the pressure surfaces 24 and 26 are beveled, sliding movement of the inner sealing member 16 results in a radially inwardly directed component of force which presses the member 16 solidly at all times against the shaft 10. Because of the cold-flow characteristics of the plastic resin material from which it is made, the inner sealing member 16 adapts itself continuously to the shaft 10 and automatically compensates for such wear as occurs. As the inner sealing member 16 advances against the outer sealing member 18 it actually becomes smaller in size as the material of the member is used up or abraded away in use. In actual practice, the sealing member 16 maintains an effective seal on the shaft 10 so long as adequate pressure is imposed on the sealing member 16, and any portion of the pressure surface 24 remains in engagement with the pressure surface 26. In practice, adequate pressure can be maintained at all times on the inner sealing member 16 either by sufficiently initially compressing the springs 40 or by adjusting the seal in any suitable manner from time to time to maintain the springs 40 under pressure. For example, in the particular seal shown, the springs 40 can be compressed periodically by inserting shims or spacers between the cover 36 and the snap ring 38.

In a seal having two sealing members 16 and 18 of the type here shown, certain critical dimensional relationships must obtain between each of the sealing members and between each sealing member and its respective back-up or retainer. When pressure is applied continuously against a plastic resin material of the type used in sealing members 16 and 18, the resin begins to deform and if the members are not properly confined and correlated with respect to each other they are soon rendered inoperative by reason of the cold-flow phenomenon. For example, the inner edge of the pressure surface 24 must not be initially larger than the inner edge of the outer pressure surface 26; otherwise axial pressure exerted against the sealing members by the springs 40 causes the inner sealing member 16 to embed itself in the pressure surface of the outer member 18 and this produces a ledge around the pressure surface of the outer sealing member which effectively prevents relative sliding movement between the two sealing members. Similarly, in a seal of this type, the outer edge of the pressure surface 24 cannot be larger in diameter than the outer edge of the pressure surface 26; otherwise, the outer sealing member 18 tends to embed itself in the pressure surface of the inner member 16 and thus create a ledge which prevents the essential relative sliding movement between the sealing members. In addition to the above, it is necessary that the inner edge of the radial face of the back-up 28 be larger than the inner diameter of the outer sealing ring 18; otherwise, the inner sealing member 16 ultimately engages the backup 28 and the latter thereafter effectively blocks or stops further axial movement of the inner sealing member and thus destroys the efficacy of the seal.

The outer edge of the radial bearing face of the spring retainer 30 should not extend outwardly beyond the sealing member 16; otherwise, the retainer 30 interferes with the operativeness of the seal as soon as the inner member 16 wears sufficiently to bring the retainer 30 into engagement with the outer sealing member 18. If the dimensional relationships referred to above are observed, a large amount of material can be worn from the inner sealing member 16 without affecting the efficacy of the seal and, under most conditions of use, an exceedingly long-lived seal is assured. It is essential that the rear flat radial bearing surface of the sealing member 16 which contacts the movable retainer 30 be substantially coincident at its outer periphery with the outer periphery of the forward surface of the retaining member 30 engaged thereby. If the sealing member 16 extends radially outwardly beyond the periphery of retaining member 30 it forms an annular lip which prevents the retaining member from moving forwardly under the action of springs 40 as it must do in compensating for wear of the sealing member 16. In addition to the above it is necessary that the front surface of the movable retaining member 30 which seats the sealing member 16 be substantially axially in line at its outer periphery with the bevelled surface of sealing member 18. The retaining member 30 will advance as the sealing element 16 becomes progressively worn until it engages the sealing member 18. If it engages the bevelled surface of sealing member 18 it will, because of the bevelled or inclined nature of the surface, continue to advance for a considerable distance to compensate for additional wear of the sealing member 16. On the other hand, if the retaining member 30 engages a radial surface of the sealing member 18 it will be stopped by the latter and the seal will not be effective thereafter to compensate for further wear of the sealing member 16. As a result the life of the seal is much longer if the retaining member first engages and presses against the bevelled surface 26 of sealing member 18.

Reference is now had to Fig. 2 which shows a seal embodying the invention having only one sealing member. This form of the invention is used primarily in situations or environments where it is necessary to seal an annular space between two relatively movable parts. For example, the drawing shows a piston 50 mounted for reciprocation in a cylinder 52. A radially outwardly extending annular flange 54 on the lower end of the piston fits the cylinder 52 relatively snugly and the portion of the piston above the flange 54 is spaced inwardly substantially from the cylinder to define an annular space 56. An annular sealing member 58 similar to the outer sealing member 18 in the form of the invention first described rests upon the flange 54 with the outer annular sealing surface 60 thereof in engagement with the cylinder 52 and the bottom radial sealing surface 62 thereof in continuous engagement with the flange 54. A pressure ring 64, similar in form to the inner sealing ring 16 of the first form of the invention, bears against the sealing member 58. In this form of the invention, however, the pressure ring 64 does not have a sealing function and it therefore can be made of any suitable material such as metal or the like. The sealing member 58, on the other hand, seals the annular space between the piston 50 and the cylinder 52 and it therefore is made of a plastic resin material such as nylon or Teflon. The pressure ring 64 has a beveled pressure surface 66 which engages and complements the pressure surface 68 of the sealing ring 58. As in the form of the invention first described, the pressure surfaces preferably are at an angle of about thirty-five degrees; however, this angle can be varied, if desired, depending upon the exigencies of the particular situation. A helical spring 70 is disposed in the annular space 56 behind the pressure ring 64, and an adjustable spring retainer 72 threaded on the piston maintains the spring 70 under sufficient tension to hold the ring 64 pressed solidly against the sealing member 58.

The sealing member 58 functions in the same manner as the outer sealing member of the form of the invention first described to seal the annular space between the piston 50 and the cylinder 52, and the pressure ring 64 functions in the same manner as the inner sealing ring 16 to hold the sealing member 58 continuously in sealing engagement with the piston and cylinder. In this form of the invention, however, it is the outer sealing member 58 which is subject to wear as it travels with the piston 50 and therefore moves back and forth along the cylinder 52 upon reciprocation of the piston. Where the seal is required to operate at a relatively high temperature or where abrasive conditions are present, considerable wear of the sealing member may occur. Regardless, however, of whether the sealing member 58 wears rapidly or slowly and regardless of the conditions causing the wear, the spring 70 forces the pressure ring 64 continuously against the sealing member 58 and causes it to expand against the wall of the cylinder 52 to compensate for wear of the sealing member as it occurs. As wear takes place, the compression spring 70 causes a movement of the pressure ring 64, and the taper surfaces 66 and 68 press the sealing member 58 against the point at which the seal is needed and sufficient pressure is maintained against the sealing member at all times to assure an effective seal. Thus, even under conditions which cause excessive wear of the sealing member 58, the pressure ring 64 and associated parts maintain an effective seal, and this is true even though a relatively large amount of material may actually be worn away from the sealing member 58. It is absolutely essential to the operativeness of the seal that the inner edge of the pressure ring 64 be smaller than the inner edge of the tapered pressure surface 68; otherwise axial pressure exerted on the pressure ring by the compression spring 70 causes the pressure ring to embed itself in the taper surface of the sealing member, and when this occurs the pressure ring creates a ledge on the sealing member which prevents relative sliding movement between the pressure ring and the sealing member and thus destroys the effectiveness of the pressure ring to expand the sealing member to compensate for wear. However, if proper dimensional relationships are maintained between the parts, the seal has an exceedingly long life under all normal conditions of use and it maintains an effective seal at all times regardless of wear or other conditions normally tending to destroy a seal.

Having thus described the invention, I claim:

1. In a seal, coaxially disposed annular sealing members having respective exposed inner and outer annular sealing surfaces and cooperating bevelled pressure surfaces opposite said sealing surfaces, both of said sealing members being of a plastic resin material having cold flow characteristics and each being continuous and unbroken around its circumference, the bevelled surfaces of one sealing member extending initially radially inwardly at least to the inner edge of the bevelled surface of the other sealing member and the bevelled surface of said other sealing member extending initially radially outwardly at least to the outer edge of the bevelled surface of said one sealing member, and retaining members behind and bearing against respective sealing members, said retaining members having flat radial annular bearing surfaces engaging correspondingly flat radial bearing surfaces of said sealing members, at least one of said retaining members being movable axially against its sealing member and the outer periphery of its radial bearing surface being substantially coincident to the periphery of the radial bearing surface of said sealing member and axially in line with the bevelled surface of said other sealing member.

2. In a seal, coaxially disposed annular sealing members having respective exposed inner and outer annular sealing surfaces and cooperating bevelled pressure surfaces opposite said sealing surfaces, both of said sealing members being of a plastic resin material having cold flow characteristics and each being continuous and unbroken around its circumference, the bevelled surfaces of one sealing member extending initially radially inwardly at least to the inner edge of the bevelled surface of the other sealing member and the bevelled surface of said other sealing member extending initially radially outwardly at least to the outer edge of the bevelled surface of said one sealing member, retaining members behind and bearing against respective sealing members, said retaining members having flat radial annular bearing surfaces engaging correspondingly flat radial bearing surfaces of said sealing members, at least one of said retaining members being movable axially against its sealing member and the outer periphery of its radial bearing surface being substantially coincident to the periphery of the radial bearing surface of said sealing member and axially in line with the bevelled surface of said other sealing member, and spring means behind said movable retaining member exerting pressure constantly axially thereagainst in the direction of said sealing elements.

References Cited in the file of this patent

UNITED STATES PATENTS

| | | |
|---|---|---|
| 234,326 | Osgood et al. | Nov. 9, 1880 |
| 494,817 | Long | Apr. 4, 1893 |
| 846,746 | Kerr | Mar. 12, 1907 |
| 1,506,420 | Flaspochler et al. | Aug. 26, 1924 |
| 2,245,106 | Karlsberg | June 10, 1941 |
| 2,467,312 | Jack | Apr. 12, 1949 |
| 2,670,973 | Ginther et al. | Mar. 2, 1954 |
| 2,745,687 | Stack | May 15, 1956 |